United States Patent
Okabayashi et al.

(10) Patent No.: US 6,751,399 B1
(45) Date of Patent: *Jun. 15, 2004

(54) IMAGE RECORDING AND REPRODUCING DEVICE UTILIZING ATTRIBUTE INFORMATION TO IDENTIFY IMAGE TYPE

(75) Inventors: Masaaki Okabayashi, Hamamatsu (JP); Eiji Takeuchi, Hamamatsu (JP); Yuji Sato, Hamamatsu (JP)

(73) Assignee: Yamaha Corporation, Hamamatsu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 318 days.

(21) Appl. No.: 09/008,261

(22) Filed: Jan. 16, 1998

(30) Foreign Application Priority Data

Jan. 21, 1997 (JP) .............................................. 9-008577

(51) Int. Cl.[7] .......................... H04N 5/783; H04N 5/225
(52) U.S. Cl. .......................... 386/68; 386/120; 348/220
(58) Field of Search ................................. 386/1, 38, 68, 386/108, 117, 120, 81, 82; 348/220–221, 231, 232, 233; 358/909.1, 906; H04N 5/225, 5/76, 5/783

(56) References Cited

U.S. PATENT DOCUMENTS

| | | | | |
|---|---|---|---|---|
| 5,589,943 A | * | 12/1996 | Kozuki et al. | 348/220 |
| 5,712,947 A | * | 1/1998 | Oguro et al. | 386/120 |
| 5,719,987 A | * | 2/1998 | Kawamura et al. | 386/120 |
| 5,809,208 A | * | 9/1998 | Komori | 386/120 |
| 5,852,467 A | * | 12/1998 | Ogino | 348/231 |
| 5,875,280 A | * | 2/1999 | Takaiwa et al. | 386/120 |
| 5,884,005 A | * | 3/1999 | Peters | 386/120 |

* cited by examiner

Primary Examiner—Thai Tran
(74) Attorney, Agent, or Firm—Pillsbury Winthrop LLP (57) ABSTRACT

Recording section stores time-varying frames of dynamic picture image information and a frame of still picture image information into a same storage area of a image storage section together in a mixed manner. Reproducing section identifies the individual frames of the dynamic picture image information and the still picture image information stored in the image storage section and then reproduces the identified frames of the dynamic picture image information and the still picture image information at reproduction speeds that are set separately for the dynamic picture image information and the still picture image information.

9 Claims, 9 Drawing Sheets

DYNAMIC PICTURE TABLE

| REPRO. SPEED | COUNTER COMPARISON VALUE | ADDRESS INCREMENT VALUE |
|---|---|---|
| 1/30 | 60 | 1 |
| 1/20 | 40 | 1 |
| 1/15 | 30 | 1 |
| 1/10 | 20 | 1 |
| 1/5 | 10 | 1 |
| 1/2 | 4 | 1 |
| 1 | 2 | 1 |
| 1.5 | 2 | 1.5 |
| 2 | 2 | 2 |
| 3 | 2 | 3 |

FIG. 5A

STILL PICTURE TABLE

| REPRO. SPEED | COUNTER COMPARISON VALUE | ADDRESS INCREMENT VALUE |
|---|---|---|
| 1(5sec) | 300 | 1 |
| 2(4sec) | 240 | 1 |
| 3(3sec) | 180 | 1 |
| 4(2sec) | 120 | 1 |
| 5(1sec) | 60 | 1 |
| 6(0.75sec) | 45 | 1 |
| 7(0.5sec) | 30 | 1 |
| 8(0.25sec) | 15 | 1 |
| 9(0.15sec) | 9 | 1 |
| 10(0.03sec) | 2 | 1 |

IMAGE RECORDING AND REPRODUCING DEVICE UTILIZING ATTRIBUTE INFORMATION TO IDENTIFY IMAGE TYPE

BACKGROUND OF THE INVENTION

The present invention relates to image recording and reproducing devices for recording and reproducing dynamic picture and still picture image information onto and from an image recording storage such as a semiconductor memory.

With a rapidly-increasing storage capacity achieved by fine pattern technology for semiconductor memory as well as advancing image compression technology, image recording and reproducing devices have been widely used today which temporarily store image data from a video camera or the like into a semiconductor memory and then reproduce the thus-stored image data from selected locations of the memory at an optional speed. These image recording and reproducing devices are suitable for use in, for example, editing of a TV commercial production and analysis of a form in playing a sport, because of their capability to record a dynamic picture for a period of tens of seconds.

Known as a typical example of such image recording and reproducing devices is a digital video tape recorder (VTR) which is equipped with a photo mode function as well as a movie mode function. When in the photo mode, the digital video tape recorder operates to store, as a still picture frame, a same frame of image information repetitively over a designated time period corresponding to a plurality of frame cycles, because reproduction from the video tape recording would inherently involve unwanted picture distortion. However, because of the repetitive storage of the same frame, the digital video tape recorder in the photo mode would present the problem that its limited storage space is wasted and thus the amount of still picture image information and dynamic picture image information recordable therein is considerably limited. Particularly, in cases where a semiconductor memory is employed, the recordable information amount is even more limited than where other forms of storage media are employed, and it is necessary that still picture image information be stored in the storage space with utmost efficiency.

In addition, a video signal recording device has been proposed in Japanese Patent Laid-open Publication A. No. HEI-5-308606, which is designed to record still picture image information on a PCM recording area of a video tape separate from a dynamic picture recording area of the tape. In reproduction, this recording device writes the still picture image information into a video RAM-and repetitively reproduces the thus-written information until next still picture image information is read in. However, the proposed video signal recording device, where dynamic picture image information and still picture image information is stored separately in the respective recording areas, is disadvantageous in that the recording capacity can not be used efficiently as a whole when only dynamic picture image information or still picture image information is recorded and also in that very complex management of reproduction addresses is required when the stored dynamic picture and still pictures are to be reproduced in succession.

SUMMARY OF THE INVENTION

It is therefore an object of the present invention to provide an improved image recording and reproducing device which permits efficient use of an image storage area, and which can optimally reproduce both dynamic picture image information and still picture image information stored together in a mixed manner without requiring complex management.

According to an aspect of the present invention, there is provided an image recording and reproducing device which comprises: an image storage section for storing therein image information including dynamic picture image information and still picture image information; a recording section that stores time-varying frames of the dynamic picture image information and a frame of the still picture image information into a same storage area of the image storage section together in a mixed manner; and a reproducing section that identifies the individual frames of the dynamic picture image information and the still picture image information stored in the image storage section and reproduces the identified frames of the dynamic picture image information and the still picture image information at reproduction speeds that are set separately for the dynamic picture image information and the still picture image information.

Because the frames of the dynamic picture image information and the still picture image information are stored together in a same storage area of the image storage section in a mixed form, the present invention can use the entire storage area of the storage section very efficiently, as compared to cases where separate storage areas are fixedly allocated for the dynamic picture image information and the still picture image information. Also, in the present invention, the frames of the dynamic picture image information and the still picture image information can be read out in succession without a particular need to distinguish between the dynamic picture image information and the still picture image information, which would substantially simplify address management involved in readout or reproduction of the frames. Further, in the present invention, only one frame is stored for each item of the still picture image information, it is possible to minimize the necessary storage space for the still picture image information. In addition, because the individual frames of the dynamic picture and still picture image information are identified as such and reproduced at respective or independently-set reproduction speeds, the present invention can provide optimum reproduced pictures for both the dynamic picture and still picture image information.

In an preferred implementation of the present invention, the recording section adds, to the frames of the dynamic picture image information and the still picture, respective attribute information for identifying the frames, and the reproducing section identifies the individual frames of the dynamic picture image information and the still picture image information on the basis of the respective attribute information added thereto. By such addition of the attribute information to the individual frames, it is possible to readily distinguish between the frame of the dynamic picture image information and the frame of the still picture image information.

In another preferred implementation of the present invention, the image recording and reproducing device further comprises a still-picture reproduction period setting section that sets a reproduction period for the still picture image information, and the reproducing section reproduces the identified frame of the still picture image information repetitively for the reproduction period set by the still-picture reproduction period setting section. With the arrangement of repetitively reproducing an identified frame of the still picture, image information for a reproduction period set by the still-picture reproduction period setting section, it is possible to readily perform a process of inserting, between the frames of the dynamic picture image information, a frame of the still picture image information over a desired time period.

Preferably, the image recording and reproducing device further comprises a dynamic-picture reproduction speed setting section that sets a reproduction speed for the dynamic picture image information, and the reproducing section reproduces the identified frames of the dynamic picture image information at the reproduction speed set by the dynamic-picture reproduction speed setting section. In this preferred implementation, the frames of the dynamic picture image information can also be reproduced at a preset reproduction speed.

In still another implementation of the present invention, the image recording and reproducing device as recited further comprises an address designating section that designates an address in the image storage section, and an attribute rewriting section that if a specific one of the frames of the dynamic picture image information stored at the address designated by the address designating section is to be changed to a frame of still-picture image information, rewrites the attribute information of the specific frame. By the attribute information rewriting arrangement, a selected frame of the dynamic picture image information, which may contain some important points of a sports-playing form, can be freely changed to a frame of still picture information and reproduced or displayed as a still picture for a preset period to allow for careful analysis of the important points.

According to another aspect of the present invention, the image recording and reproducing device comprises an image storage section that stores therein image information including dynamic picture image information and still picture image information in such a manner that each frame of the still picture image information is interposed between frames of the dynamic picture image information. The frames of the image information are reproduced in a successive manner, during which time a determination is made, for each of the frames, as to whether the frame is of the dynamic picture image information or of the still picture image information so that each of the frames determined as being of the still picture image information is reproduced repetitively for a preset time period.

Due to the arrangement that the still picture image information is stored in the image storage section in such a manner that each frame of the still picture image information is interposed between frames of dynamic picture image information, and the individual frames of the image information are reproduced in a successive manner while a determination is made, for each of the frames, as to whether the frame in question is of the dynamic picture image information or of the still picture image information so that each of the frames determined as being of the still picture image information is reproduced repetitively for a preset time period, the still picture frame is allowed to be displayed, between the dynamic picture frames, at appropriate timing for an appropriate time period by just storing it at an appropriate location of the storage section. Thus, the present invention permits display of an address telephone number, etc. between commercials.

BRIEF DESCRIPTION OF THE DRAWINGS

Now, preferred embodiments of the present invention will be described in detail with reference to the accompanying drawings, in which.

DETAILED DESCRIPTION OF THE PREFERRED EMBODIMENTS

Figure 1:
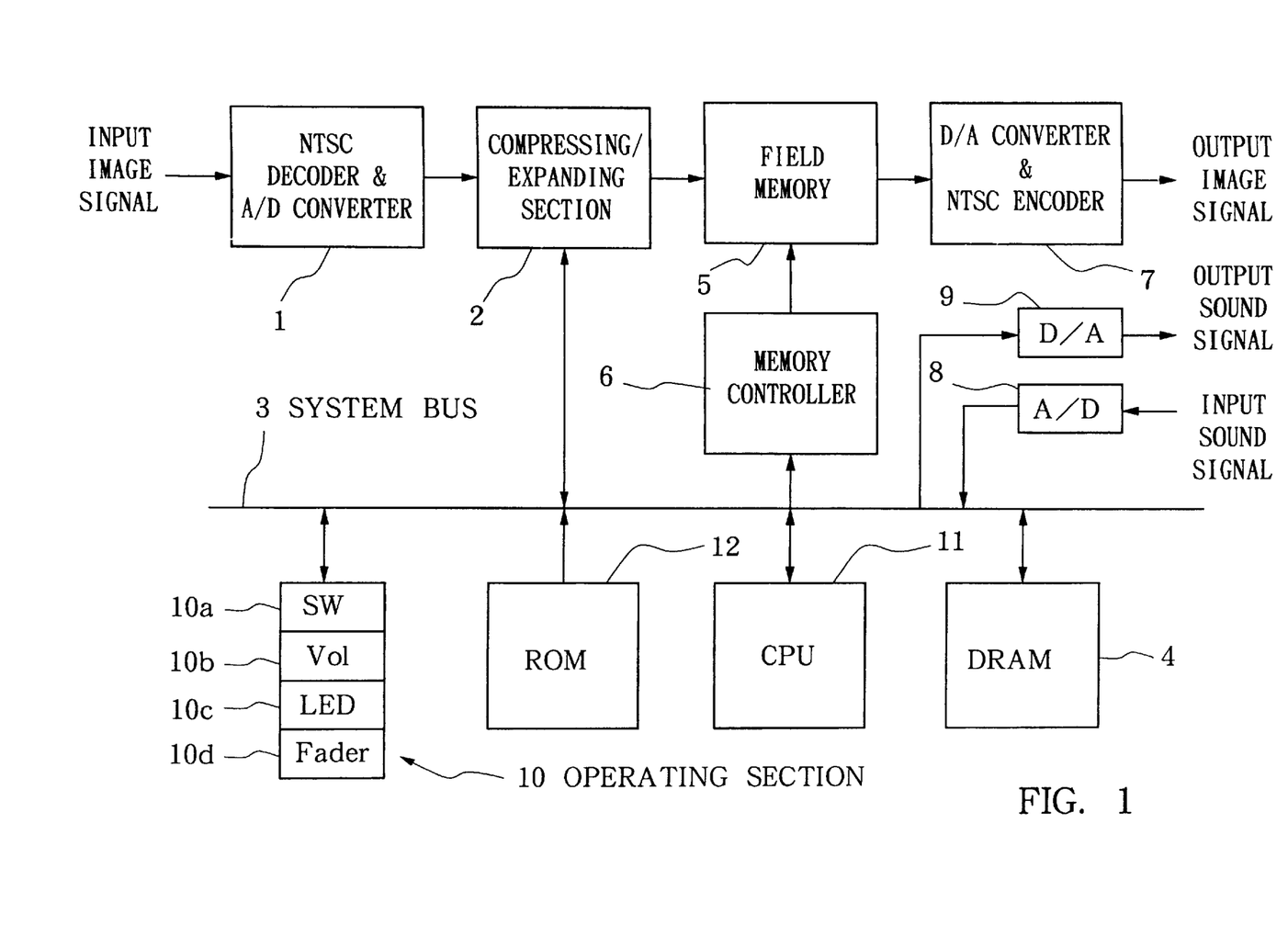
FIG. 1 is a block diagram illustrating a hardware setup of an image recording and reproducing device in accordance with an embodiment of the present invention.

FIG. 1 is a block diagram illustrating a hardware setup of an image recording and reproducing device in accordance with an embodiment of the present invention.

In this image recording and reproducing device, each input image signal conforming to the NTSC standard is first decoded and converted by an NTSC decoder and A/D converter section 1 to provide time-serial digital color image data based on horizontal/vertical scanning. The digital color image data are compressed by a data compressing/expanding section 2 using, for example, the known Motion JPEG (Joint Photographic Coding Experts Group) method. Specifically, the data compressing/expanding section 2 converts the image data, on a frame-by-frame basis, to provide compressed image data (i.e., JPEG bit stream). To increase data storage efficiency, the present embodiment is designed in such a manner that only one field of image data is stored as a frame for recording and the same field is read twice as first and second fields for subsequent interpolation to provide a frame of image data for reproduction. The compressed image data are transferred via a system bus 3 to a DRAM (Dynamic Random Access Memory) 4 for storage therein. For example, the DRAM 4 has a total storage capacity of 12 Mega bytes and includes an image storage area that is capable of storing up to 450 frames (30 frames per second) of compressed image data and hence storing a dynamic picture for 15 seconds. The image storage area is in the form of a ring buffer, where oldest data are always overwritten by successive image data recording. The compressed data read out from the DRAM 4 are supplied via the system bus 3 to the data compressing/expanding section 2 for expansion thereby and then written into a field memory 5 on a field-by-field basis. Memory controller 6 controls read/write operation of the field memory 5. The image data sequentially read out from the field memory 5 are converted by a D/A converter and NTSC encoder section 7 into an analog NTSC signal and then provided as an output image signal.

As noted above, the present preferred embodiment is designed to increase data storage efficiency by recording only one field of image data as a frame so that the single field is read twice as first and second fields to be output in succession for reproduction. In an alternative, however, two fields of image data may be recorded as a frame in order to improve image quality.

In the meantime, input stereo sound signals from an external source are converted by an A/D converter 8 into digital representation and then stored into a sound storage area of the DRAM 4 for synchronized readout with the image data. The sound data read out from the sound storage area of the DRAM 4 are output as output sound signals after conversion by a D/A converter 9.

Operating section 10 includes various switches 10a, volume controls 10b, LEDs (Light Emitting Diodes) 10c and a fader 10d, and the section 10 is used for selecting and setting various operational conditions of the device, such as start/stop of recording and reproduction modes and recording and reproduction speeds of still and dynamic pictures, as will be described later in relation to FIG. 2.

CPU 11 executes overall operations of the image recording and reproducing device, and ROM 12 has prestored therein operating programs and tables for use by the CPU 11.

Figure 2:
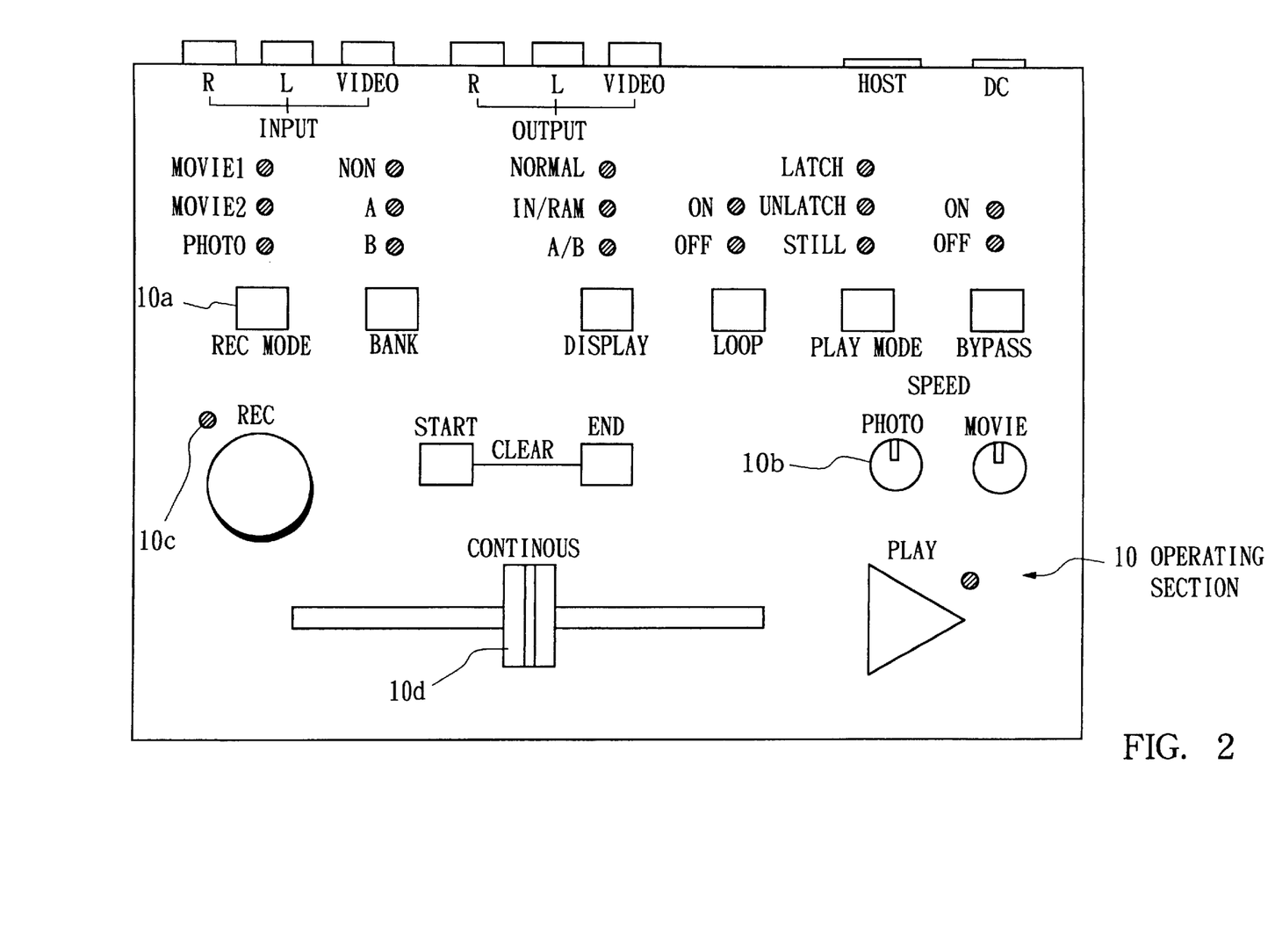
FIG. 2 is a schematic diagram illustrating details of an operating section shown in FIG. 1.

FIG. 2 is a schematic diagram illustrating details of the operating section 10. REC (record) switch and PLAY switch are for instructing a start/stop of recording and reproduction, respectively. REC MODE switch is for selectively setting an operating mode of the REC switch from among a plurality of modes: MOVIE1 mode to allow successive overwrite recording of a dynamic picture; MOVIE2 mode to allow successive recording of a dynamic picture up to a maximum recording time; and PHOTO mode to allow recording of a still picture. In the PHOTO mode, a still picture is recorded in response to each short-time depression of the REC switch, and a continued (long-time) depression of the REC switch causes a plurality of still pictures to be successively recorded at preset time intervals. The PLAY switch is for setting an operating mode of the PLAY switch from among a plurality of modes: LATCH mode in which depression of the PLAY switch starts reproduction and re-depression of the PLAY switch ends the reproduction; UNLATCH mode in which reproduction is maintained during continued depression of the PLAY switch; and STILL mode in which reproduction is advanced by one frame in response to each short-time depression of the PLAY switch and reproduction is advanced successively by a plurality of frames in response to a continued depression of the PLAY switch.

Further, START and END switches are for instructing a start and end of reproduction, respectively. SPEED volume control for MOVIE is for designating a reproduction speed of a dynamic picture, while SPEED volume control for PHOTO is for designating a reproduction speed of still pictures and time intervals in successive recording. CONTINUOUS fader is for manually designating optional reproduction addresses in the image storage area of the DRAM 4 and typically used for manual successive frame advances.

Figure 3:
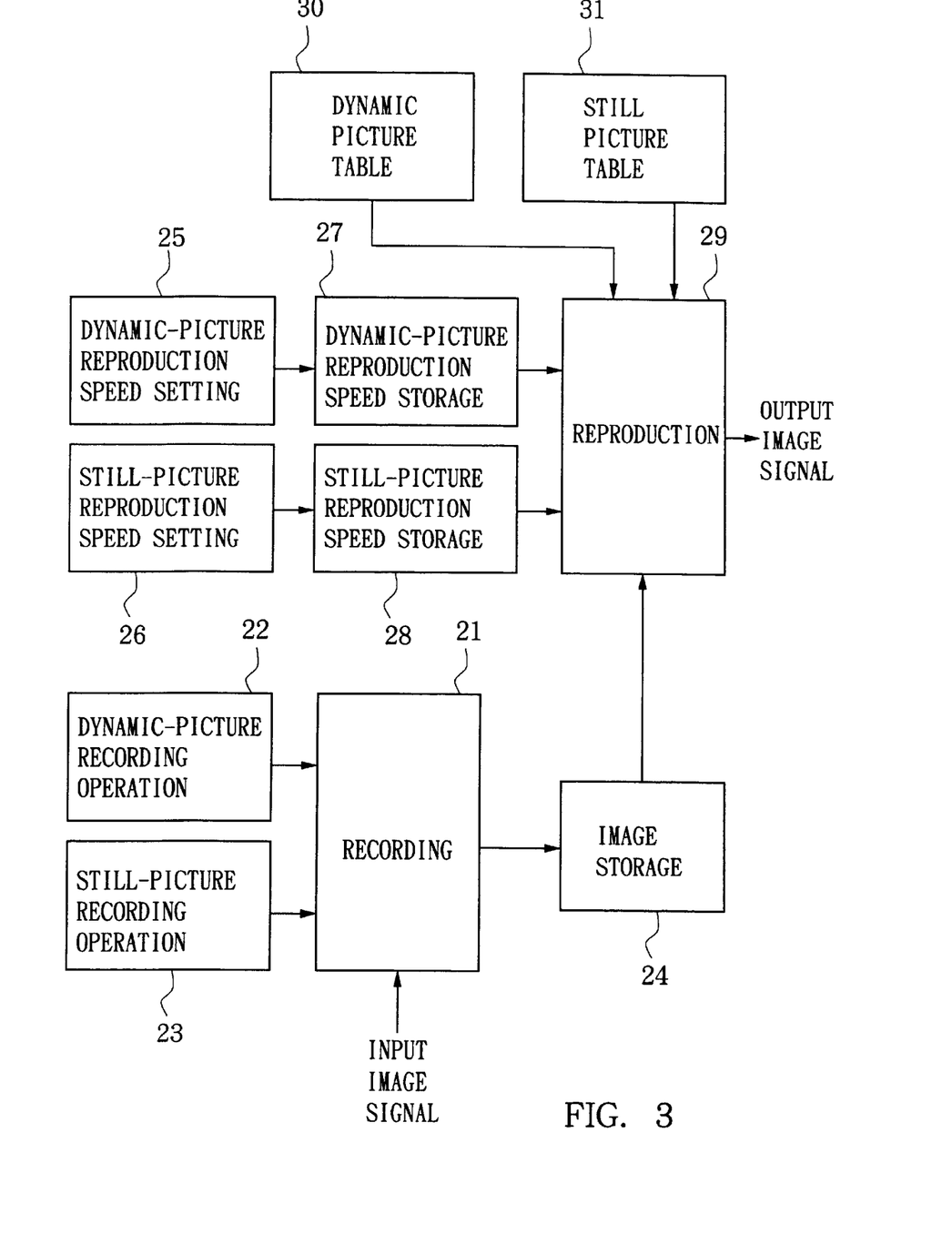
FIG. 3 is a functional block diagram of the image recording and reproducing device of FIG. 1.

FIG. 3 is a functional block diagram showing the image recording and reproducing device in terms of its various functions essential for recording and reproduction of dynamic and still pictures. Recording section 21 corresponds to the functions of the NTSC decoder and A/D converter section 1, data compressing/expanding section 2, CPU 11, ROM 12, etc., and reproduction section 29 corresponds to the functions of the CPU 11, ROM 12, data compressing/expanding section 2, field memory 5, memory controller 6, D/A converter and NTSC encoder section 7, etc. Image storage section 24 corresponds to the image storage area of the DRAM 4, and reproduction-speed storage sections 27 and 28 correspond to a working area of the DRAM 4. Further, recording operation section 22 and 23 and speed setting sections 25 and 26 correspond to the operational entry functions of the operating section 10, CPU 11, etc. Tables 30 and 31 are prestored in the ROM 12.

In response to operation of the dynamic-picture recording operation section 22 and still-picture recording operation section 23, the recording section 21 converts input image signals into digital image data and writes the converted image data into the image storage section 24. Dynamic-picture reproduction speed and still-picture reproduction speed designated via the speed setting sections 25 and 26 are stored into the respective reproduction speed storage sections 27 and 28. The reproduction section 29 refers to the dynamic picture table 30 and still picture table 31 to obtain parameters necessary for the reproduction, in accordance with the reproduction speeds thus stored in the reproduction speed storage sections 27 and 28. Then, the reproduction section 29 reproduces the dynamic and still picture data from the storage section 24 at the respective designated speeds, so as to provide output image signals.

Figure 4:
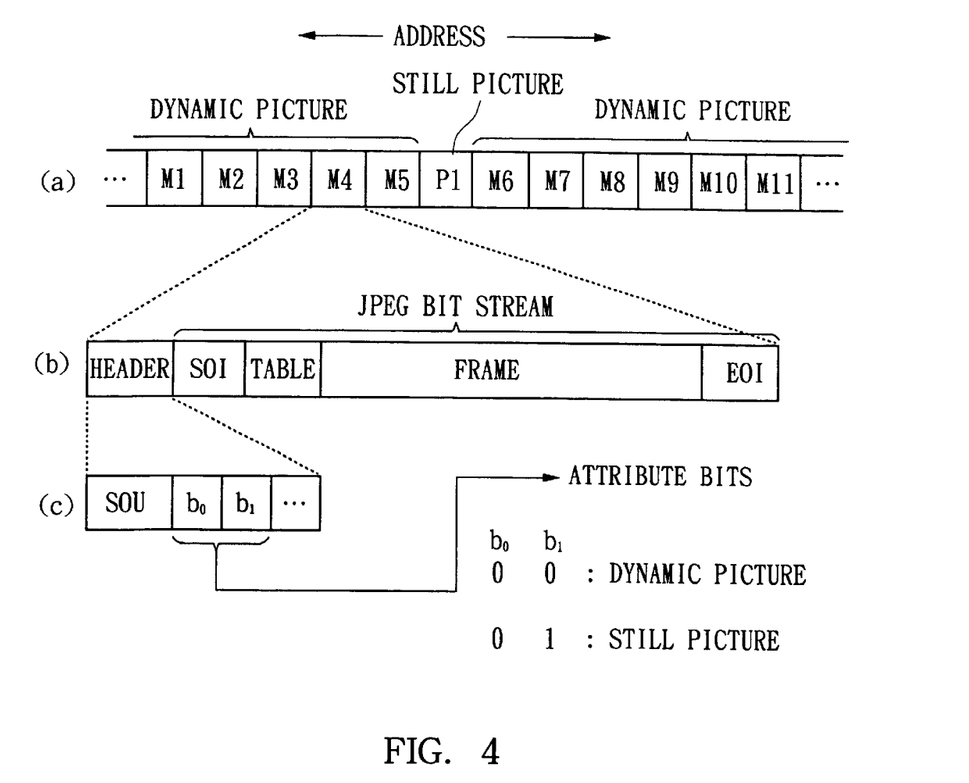
FIG. 4 is a diagram showing an exemplary manner and exemplary format in which compressed image data are stored in an image storage section of FIG. 3.

FIG. 4 is a diagram showing an exemplary manner and exemplary format in which compressed image data are stored in the image storage section 24. In (a) of FIG. 4, M1, M2, . . . , M5 represent frames of a dynamic picture, P1 following M5 represents only one frame of a still picture, and M6, M7, . . . , M11 following P1 represent frames of a dynamic picture. As shown in (b) of FIG. 4, each frame of the dynamic and still pictures includes header information and a JPEG (Joint Photographic Coding Experts Group) bit stream following the header information. The JPEG bit stream includes a start marker of the image data known as SOI (Start of Image), a table such as a Huffman table or quantization table, frame data, i.e., the substance of the image data, and an end marker of the image data known as EOI (End of Image). As further shown in (c) of FIG. 4, the header information includes SOU (Start Of User) and attribute bits b0 and b1. If the attribute bits b0 and b1 are both "0" it means that the frame is of dynamic picture data, and if the attribute bits b0 and b1 are "0" and "1", it means that the frame is of still picture data. These attribute bits are imparted to the image data via the recording section 21 depending on which of the operating sections 22 and 23 has been activated.

As the image data are read out in order of ascending addresses, the individual frames M1, K2, . . . , M5, P1, M6, . . . M11, . . . are read out in the mentioned order; however, the still picture frame P1 can not be visually identified because it is displayed for only $\frac{1}{30}$ second. Thus, the present embodiment is designed in such a manner reproduction speeds of dynamic and still pictures can be set via the reproduction speed setting sections 25 and 25 separately from each other. By retrieving necessary parameters from the tables 30 and 31 on the basis of the thus-set speeds, the reproduction section 29 controls displaying speeds of the stored pictures.

Figure 5A:
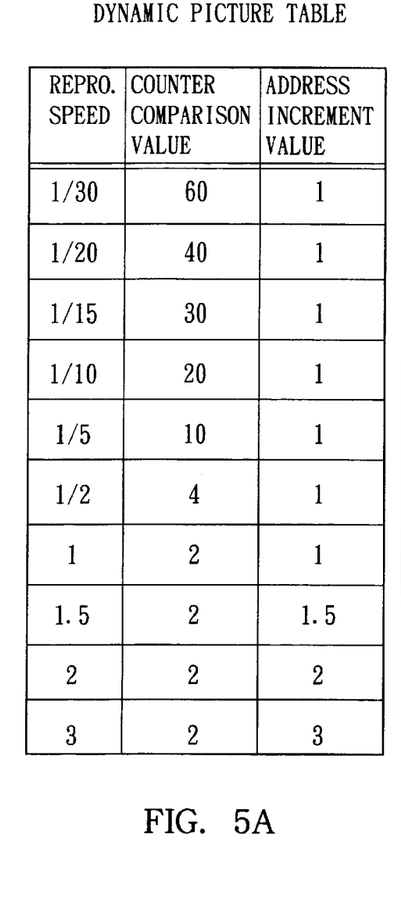
FIGS. 5A and 5B show exemplary contents of a dynamic picture table and a still picture table shown in FIG. 4.
Figure 5B:
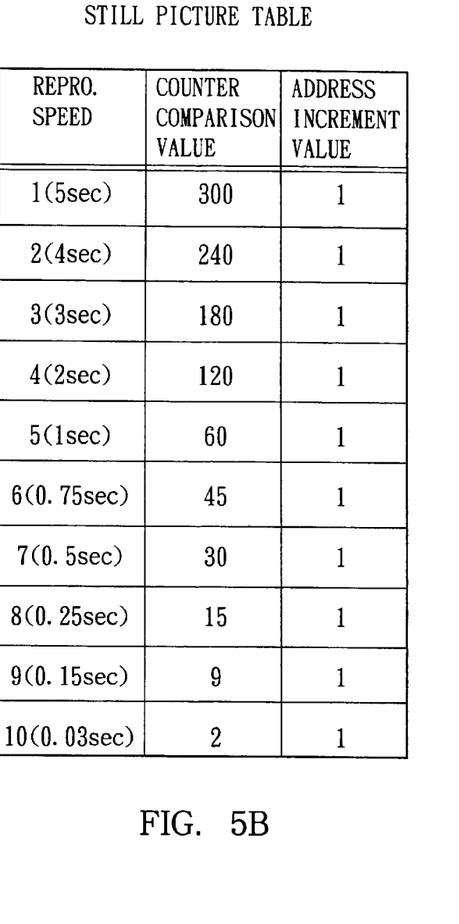

FIGS. 5A and 5B show exemplary contents of the dynamic picture table 30 and still picture table 31. For the dynamic picture, the reproduction speed is variable through 10 steps within a range of 1/30 to 3 times of the normal speed. Counter comparison values and address increment values are set in association with the 10 reproduction speed values. Similarly, for the still picture, the reproduction speed is variable through 10 steps from speed 1 (5 sec. ) to speed 10 (3 msec. ), and counter comparison values and address increment values are set in association with the 10 reproduction speed values. The counter comparison value indicates a specific number of fields to be displayed before switching to a next frame , and this value becomes greater as the reproduction speed gets lover. The address increment value indicates an address incrementing value for switching to a next frame, this value is "1" at and below the normal speed and greater than "1" at higher reproduction speeds.

Now, a detailed description will be made about reproduction operations carried out in the present embodiment.

Figure 6:
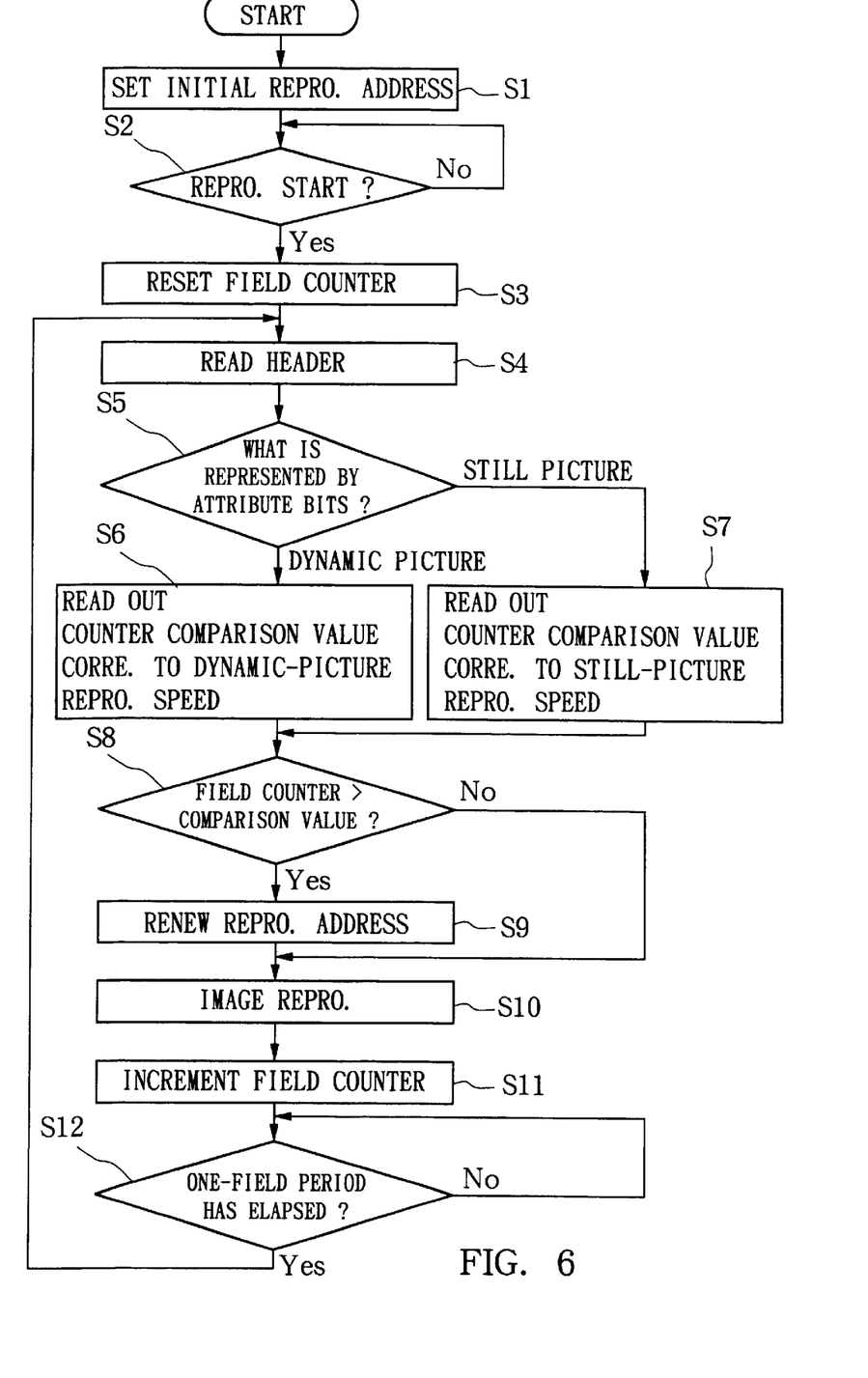
FIG. 6 is a flowchart of an example of a reproduction process performed by a reproduction section shown in FIG. 4.

FIG. 6 is a flowchart of an example of a reproduction process performed by the reproduction section 29. First, at step S1, an initial value of reproduction address is set, which may be a head address in the image storage section 24 or a start address set via the START switch. Once a reproduction start instruction is given via the PLAY switch as determined at step S2, a field counter (a variable held in the DRAM 4) that indicates how many fields of a same picture frame has been displayed is reset at step S3. Then, header information is read out at step S4, and values of the attribute bits are determined at step S5. If the values of the attribute bits represent a dynamic picture frame as determined at step S5, control proceeds to step S6 in order to read out a counter comparison value corresponding to a dynamic-picture reproduction speed designated from the dynamic picture table 30, and then a comparison is made at step S5 between a current value of the field counter and the read-out counter comparison value. If, on the other hand, the values of the attribute bits represent a still picture frame as determined at step S5, control branches to step S7 in order to read out a counter comparison value corresponding to a still-picture reproduction speed designated from the still picture table 31, and then a comparison is made at step 38 between the current value of the field counter and the read-out counter comparison value.

If the current value of the field counter is greater than the read-out counter comparison value as determined at step S8, then the reproduction address is renewed or incremented at step S9, but if not, control jumps to step S10 without renewing the reproduction address. Image reproduction operation is executed at step 10 and the field counter is incremented at step S11. When a one-field time period or 15 msec. has elapsed as determined at step S12, control loops back to step S4 in order to read out header information of image data at a designated reproduction address and the above-mentioned operations after step S4 will be repeated.

Figure 7A:
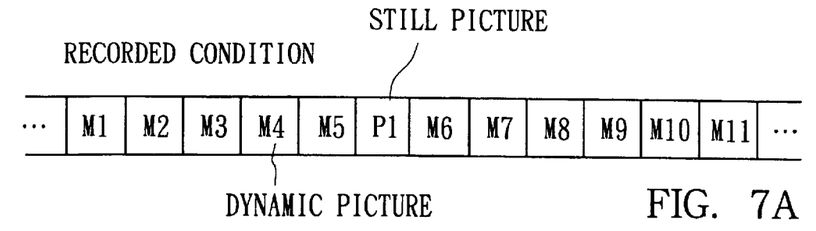
FIGS. 7A to 7C are diagrams explanatory of details of the reproduction process of FIG. 6.
Figure 7B:
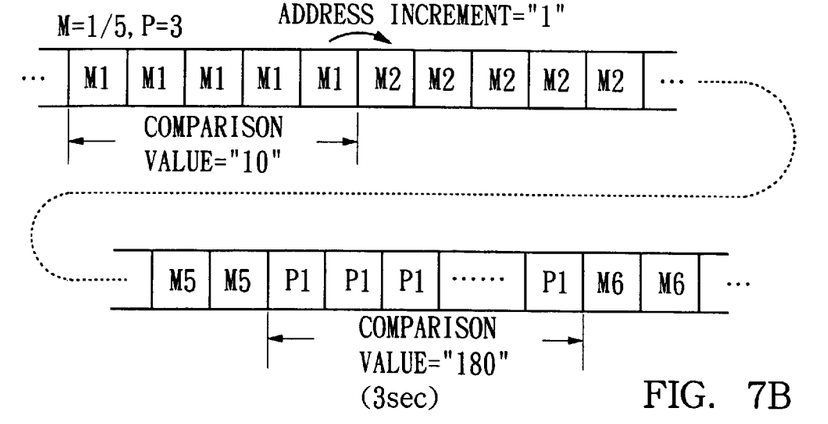
Figure 7C:
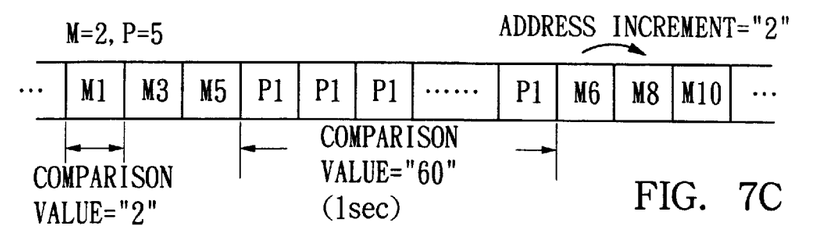

FIGS. 7A to 7C are diagrams explanatory of details of the reproduction process of FIG. 6. Let's assume here that the image storage section 24 has prestored therein image data in the manner as shown in FIG. 7A. In FIG. 7B, there is shown a time series of frames reproduced when the dynamic-picture reproduction speed is set to "1/5" and the still-picture reproduction is set to "3".

Now that the dynamic-picture reproduction speed is "1/5" of the normal speed for slow reproduction, a counter comparison value "10" and address increment value "1" are read out from the dynamic picture table 30. Also, now that the still-picture reproduction speed is "3" (3 sec. reproduction period), a counter comparison value "180" and address increment value "1" are read out from the still picture table 31. Because the reproduction address is not renewed, during reproduction of dynamic picture frames M1 to M5, before 10 fields of a same frame have been displayed, the same frame is repetitively reproduced over a five-frame time period as shown. Once the reproduction address is incremented by one after the repetitive display of the same frame over a five-frame time period, the next frame is repetitively reproduced over a five-frame time period. By repeating such a repetitive display, slow reproduction at the "1/5" reproduction speed is achieved. Once the reproduction address has reached the address for still picture frame P1, still picture frame P1 is displayed over a 180-field time period, i.e., for 3 seconds because the counter comparison value of still picture is "180". The above-noted operations will also take place in reproduction of each of the succeeding dynamic picture frames.

FIG. 7C shows a time series of frames reproduced when the dynamic-picture reproduction speed is set to "two times" of the normal speed and the still-picture reproduction is set to "5". In this case, a counter comparison value "60" and address increment value "1" are read out from the still picture table 31. Because the reproduction address is incremented by two for every two-field display during reproduction of dynamic picture frames M1 to M5. every second frame is reproduced in order of M1, M3 and M5 and each of the frames M1, M3 and M5 is displayed only for a one-frame time period. This way, double-speed dynamic picture reproduction is achieved. Once the reproduction address has reached the address of still picture frame P1. still picture frame P1 is displayed over a 60-field time period, i.e., for one second because the counter comparison value of still picture is "60". The above-noted operations will also take place in reproduction of each of the succeeding dynamic picture frames.

In the above-mentioned manner, the image recording and reproducing device according to the present embodiment can successively reproduce the dynamic and still pictures together in a mixed manner and also can set the dynamic-picture and still-picture reproduction speeds separately from each other to thereby allow the dynamic and still pictures to be reproduced at the separately-set speeds. Thus, the image recording and reproducing device is very useful for editing of commercials and new-product promotion video that contain dynamic and still pictures together in a mixed manner. Further, because the image storage area of memory is not divided for storage of dynamic and still pictures and yet only one frame is stored for each still picture, the image recording and reproducing device can use the image storage area with greatly increased efficiency.

The present invention is not limited to the above-described embodiment and may be modified in a variety of ways without departing from the basic inventive concepts.

Figure 8:
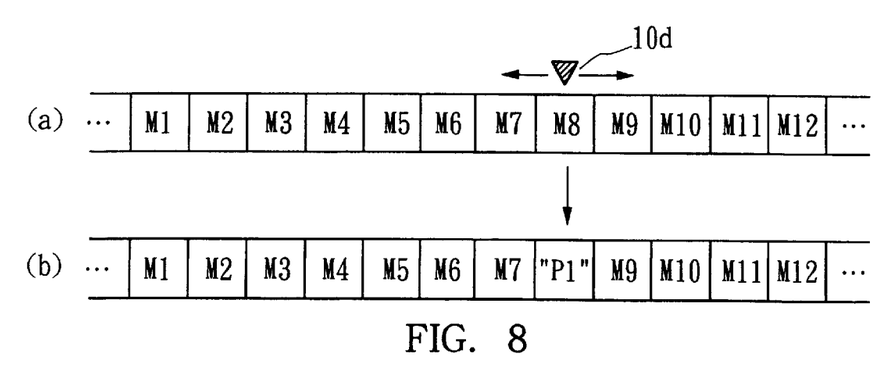
FIG. 8 is a diagram explanatory of-a modification of the present invention.

FIG. 8 is a diagram explanatory of a modification of the present invention, where a dynamic picture frame is changed to a still picture frame by the user designating a desired reproduction point therein. Let's assume that dynamic picture frames M1, M2, ..., K12, ... are prestored in the image storage section 24, as shown in (a) of FIG. 8. In this case, the image recording and reproducing device is placed in a "dynamic-to-still" changing mode, and the user operates the above-mentioned fader 10d to designate a particular reproduction address in the dynamic picture where the picture is to be changed to a still picture. Then, in response to user's activation of the REC switch, the recording section 21 is caused to rewrite the header information and change a selected one of the dynamic picture frames (e.g., M8) to still picture frame P1.

By reproduction of image information containing still picture frame P1 having thus replaced the selected dynamic picture frame, the modification of FIG. 8 can halt display of the dynamic picture at a particular frame for a selected time. Thus, the image recording and reproducing device can be useful for analysis of golf swing form, etc.: for example, a golfer's posture at the moment of hitting the ball can be effectively analyzed-by halting the dynamic picture for a few seconds.

Figure 9:
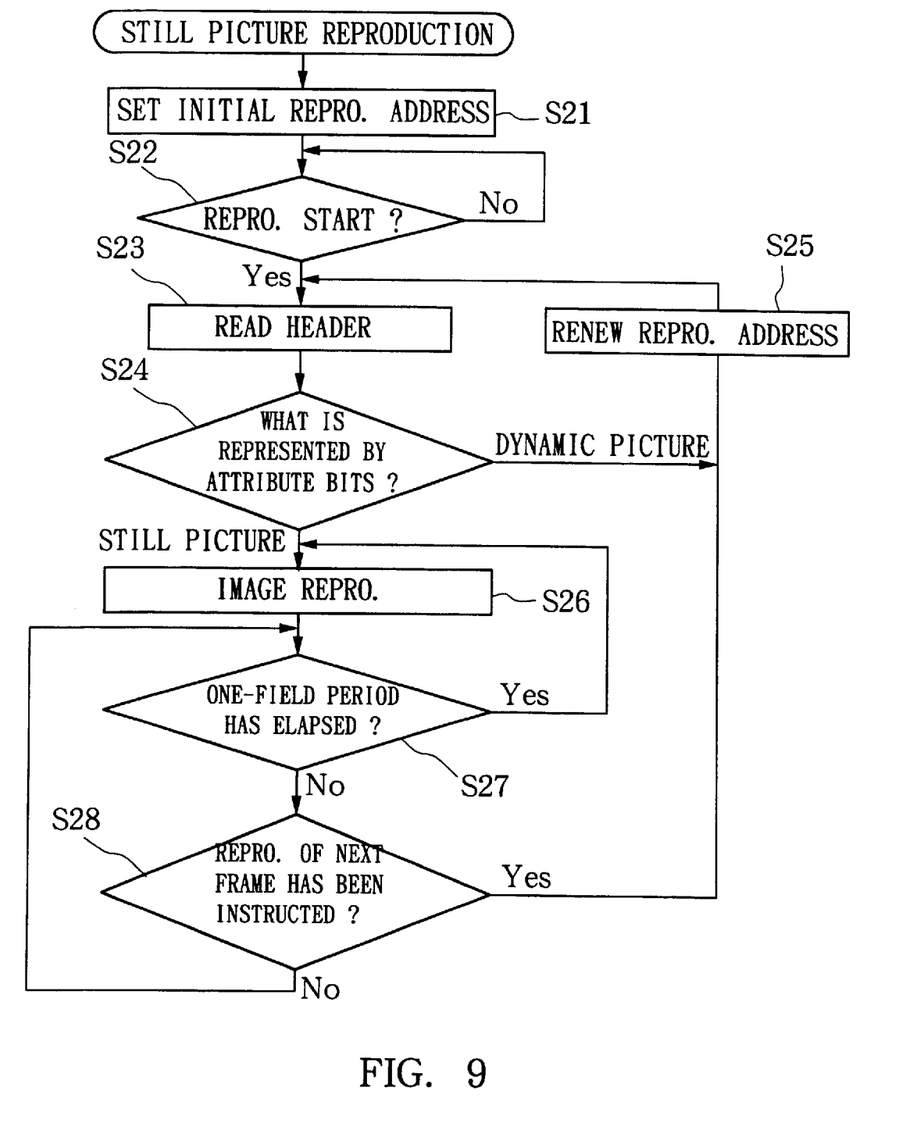
FIG. 9 is a flowchart explanatory of another modification of the present invention.

FIG. 9 is a flowchart explanatory of another modification of the present invention and more particularly illustrates a process which is arranged to extract, from image information stored in the image storage section 24 and containing dynamic picture and still picture frames together in a mixed manner, only the still picture frames and to reproduce the extracted frames one by one.

First, at step S21, an initial value of reproduction address is set. Once a reproduction start instruction is given as determined at step S22, header information of the image data is read out at step S23, and values of the attribute bits are determined at step S24. If the values of the attribute bits represent a dynamic picture as determined at step S24, the reproduction address is renewed at step S25 and header information of next image data is read out at step S23. If, on the other hand, the values of the attribute bits represent a still picture as determined at step S24, the image data is reproduced at step S26 and control waits until a one-field time period has elapsed. If reproduction of a next still picture is instructed before lapse of the one-field time period, the reproduction address is renewed at step S25 and header information of next image data is read out at step S23; otherwise, reproduction of the same image data is repeated at step S26.

Figure 10:
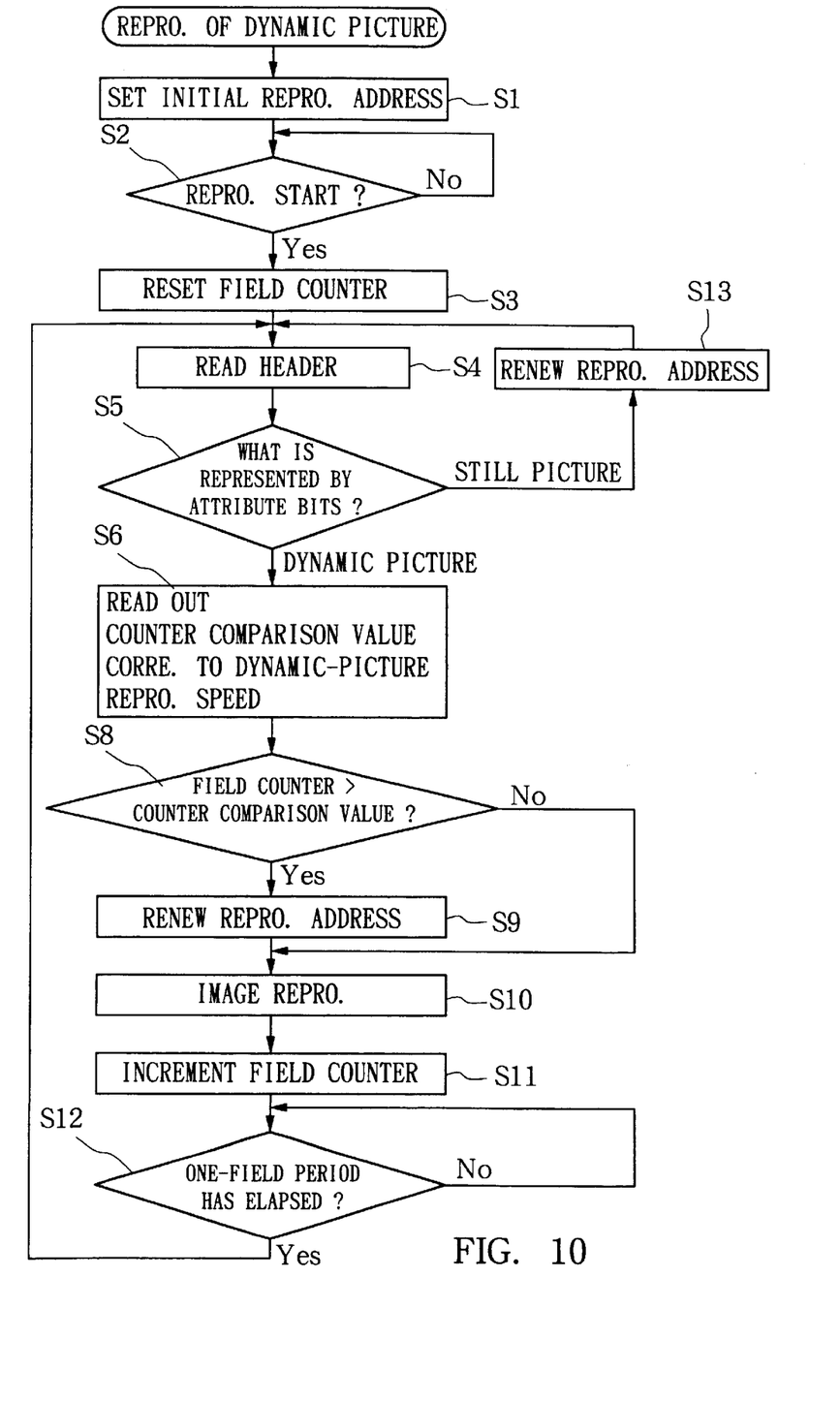
FIG. 10 is a flowchart explanatory of still another modification of the present invention.

FIG. 10 is a flowchart explanatory of still another modification of the present invention and more particularly illustrates a process for reproducing only a dynamic picture. This process reproduces a dynamic picture in generally the same manner as the reproduction process of FIG. 6. and the same steps as those in FIG. 6 are denoted by same reference characters as in FIG. 6. The process of FIG. 10 is different from the process of FIG. 6 in that if values of the attribute bits from the header information represent a still picture as determined at step S5, the reproduction address is renewed to read out header information of next image data at step S13.

Through such a process, it is possible to reproduce only a dynamic picture or reproduce only a still picture frame by frame with no consideration of recording locations of the still picture relative to recording locations of a dynamic picture. Whereas the process of FIG. 10 is shown as merely skipping readout of a still picture frame once it is detected, a last-reproduced dynamic picture frame may be displayed in place of the detected still picture frame, in which case unwanted deviation in time (frame) that would occur during reproduction of the dynamic picture can be completely avoided even where dynamic picture frames sandwich therebetween the still picture frame.

In summary, the present invention is characterized in that frames of dynamic picture image information and still picture image information are stored together in a same storage area of the image storage section in a mixed form with only one frame being stored for each item of the still picture image information, and also in that the individual frames of the dynamic picture image information and the still picture image information stored are identified as such so that they are reproduced at reproduction speeds that are set separately for the dynamic picture image information and the still picture image information. By such arrangements, the present invention can use the entire storage area of the storage section with increased efficiency and can also provide optimum reproduced pictures for both the dynamic picture image information and the still picture image information.

What is claimed is:

1. An image recording and reproducing device comprising:
   an image storage section for storing therein image information including dynamic picture image information and still picture image information in a solid-state memory;
   a recording section that stores time-varying frames of the dynamic picture image information and one frame of the still picture image information for each corresponding item of the still picture image information into a same storage area of said image storage section together in a mixed manner; and
   a reproducing section that identifies a type of image as a still picture image or a dynamic picture image for each one of the frames of the dynamic picture image information and the still picture image information stored in said image storage section and reproduces the identified frames of the dynamic picture image information and the still picture image information at reproduction speeds that are set separately for the dynamic picture image information and the still picture image information, wherein said recording section adds, to the frames of the dynamic picture image information and the still picture image information, respective attribute information in a one-to-one correspondence to each one of the frames for identifying the frames, and said reproducing section identifies the type of any single one of the frames of the dynamic picture image information and the still picture image information solely on the basis of the respective attribute information added to each one of the frames, and wherein each item of the still picture image information may be reproduced directly from a single recorded still picture image information frame by reproducing said single still picture image information frame repeatedly for a predetermined time period, the predetermined time period for each still picture image information frame being stored within each still picture image information frame.

2. An image recording and reproducing device as recited in claim 1 which further comprises a still-picture reproduction period setting section that sets a reproduction period for the still picture image information, and wherein said reproducing section reproduces the identified frame of the still picture image information repetitively for the reproduction period set by said still-picture reproduction period setting section.

3. An image recording and reproducing device as recited in claim 1 which further comprises a dynamic-picture reproduction speed setting section that sets a reproduction speed for the dynamic picture image information, and wherein said reproducing section reproduces the identified frames of the dynamic picture image information at the reproduction speed set by said dynamic-picture reproduction speed setting section.

4. An image recording and reproducing device as recited in claim 1 which further comprises an address designating section that designates an address in said image storage section, and an attribute rewriting section, that if a specific one of the frames of the dynamic picture image information stored at the address designated by said address designating section is to be changed to a frame of still-picture image information, rewrites the attribute information of the specific frame.

5. An image recording and reproducing device according to claim 1, wherein the reproduction speeds for the dynamic picture image information and the still picture image information are set by referring to a dynamic picture table and a still picture table storing dynamic picture image parameters and still picture image parameters, respectively, for determining the reproduction speeds of the identified frames of the dynamic picture image information and the still picture image information.

6. The image recording and reproducing device according to claim 1, wherein each one of the frames contains a single attribute information.

7. A method of recording and reproducing image information, the method comprising the steps of:

storing image information including dynamic picture image information and still picture image information in a solid-state memory of an image storage section;

storing, in a recording section, time-varying frames of the dynamic picture image information and one frame of the still picture image information for each corresponding item of the still picture image information into a same storage area of said image storage section together in a mixed manner;

identifying, in a reproducing section, a type of image as a still picture image or a dynamic picture image for each one of the frames of the dynamic picture image information and the still picture image information stored in said image storage section; and reproducing the identified frames of the dynamic picture image information and the still picture image information at reproduction speeds that are set separately for the dynamic picture image information and the still picture image information, wherein said recording section adds, to the frames of the dynamic picture image information and the still picture image information, respective attribute information in a one-to-one correspondence to each one of the frames for identifying the frames, and said reproducing section identifies the type of any single one of the frames of the dynamic picture image information and the still picture image information solely on the basis of the respective attribute information added to each one of the frames, and wherein each item of the still picture image information may be reproduced directly from a single recorded still picture image information frame by reproducing said single still picture image information frame repeatedly for a predetermined time period, the predetermined time period for each still picture image information frame being stored within each still picture image information frame.

8. The method according to claim 7, wherein one field of image data is stored as a frame for recording in the recording section and the same field is read twice as first and second fields for subsequent interpolation to provide a frame of image data for reproduction.

9. The method according to claim 7, wherein each one of the frames contains a single attribute information.

* * * * *